(12) United States Patent
Diehl et al.

(10) Patent No.: US 12,497,861 B2
(45) Date of Patent: Dec. 16, 2025

(54) VIRTUAL DECOUPLING METHOD FOR MANAGING MULTIPHASE STREAMS IN SUBSEA OIL PRODUCTION MODULES

(71) Applicants: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

(72) Inventors: Fabio Cesar Diehl, Rio de Janeiro (BR); Jorge Otávio Trierweiler, Porto Alegre (BR); Marcelo Farenzena, Porto Alegre (BR)

(73) Assignees: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

( * ) Notice: Subject to any disclaimer, the term of this patent is extended or adjusted under 35 U.S.C. 154(b) by 0 days.

(21) Appl. No.: 19/203,811

(22) Filed: May 9, 2025

(65) Prior Publication Data

US 2025/0347194 A1   Nov. 13, 2025

(51) Int. Cl.
*E21B 34/08* (2006.01)
*E21B 43/12* (2006.01)

(52) U.S. Cl.
CPC .............. *E21B 34/08* (2013.01); *E21B 43/12* (2013.01)

(58) Field of Classification Search
CPC ................................. E21B 34/08; E21B 43/12
See application file for complete search history.

(56) References Cited

U.S. PATENT DOCUMENTS

| | | | | |
|---|---|---|---|---|
| 6,318,156 B1 * | 11/2001 | Dutton | ................... | G01N 9/002 |
| | | | | 73/861.04 |
| 2017/0058659 A1 * | 3/2017 | El-Bakry | ................ | E21B 44/00 |

(Continued)

FOREIGN PATENT DOCUMENTS

| BR | 112016016005-3 A2 | 10/2016 |
| BR | 102015019642-3 A2 | 2/2017 |

(Continued)

*Primary Examiner* — Shane Bomar
(74) *Attorney, Agent, or Firm* — McCarter & English, LLP; Wei Song

(57) ABSTRACT

The present invention refers to a virtual decoupling method for managing multiphase streams in subsea oil production modules, which comprises: obtaining, by means of flow rate transducers, the measurement of the flow rate in the valves V1, V2, V3 and V4; obtaining, by means of gas-liquid ratio transducers (GLRT), the measurement of the gas-liquid ratio of the multiphase streams at the outlets of the subsea oil production module (GLR1, GLR2); obtaining, by means of the pressure transducer PT01 and the level transducer LT01, the measurement of pressure and level in the separator vessel; obtaining, by means of the flow rate transducers FT02 and FT03, the measurement of the flow rate of the gas streams; obtaining, by means of the flow rate transducers FT01 and FT04, the measurement of the flow rate of the liquid streams; calculating the total liquid flow rate (TLF) and the total gas flow rate (TGF); adjusting the GLR values for subsea processing conditions (GLRS); and defining the setpoint of the flow rate controllers of the streams leaving the separator vessel (FIC1SP, FIC2SP, FIC3SP and FIC4SP).

5 Claims, 5 Drawing Sheets

(56) References Cited

U.S. PATENT DOCUMENTS

| | | | |
|---|---|---|---|
| 2017/0174530 A1* | 6/2017 | Yin | B01D 17/0217 |
| 2018/0216819 A1* | 8/2018 | Carelli | F23N 1/00 |
| 2020/0240255 A1* | 7/2020 | Forthuber | C02F 1/38 |
| 2023/0115384 A1* | 4/2023 | Diehl | G05D 11/13 |
| | | | 137/154 |
| 2023/0193755 A1* | 6/2023 | Chen | E21B 34/06 |
| | | | 166/250.12 |
| 2024/0167373 A1* | 5/2024 | Diehl | E21B 43/36 |
| 2025/0075597 A1* | 3/2025 | Alsaleh | E21B 43/00 |

FOREIGN PATENT DOCUMENTS

| | | |
|---|---|---|
| BR | 102021020223-8 A2 | 5/2022 |
| WO | 2021/209172 A1 | 10/2021 |

\* cited by examiner

VIRTUAL DECOUPLING METHOD FOR MANAGING MULTIPHASE STREAMS IN SUBSEA OIL PRODUCTION MODULES

RELATED APPLICATIONS

This application claims priority to Brazilian patent application 1020240093739 filed May 13, 2024, the entire contents of which are incorporated herein by reference.

FIELD OF THE INVENTION

The present invention falls within the scope of oil exploration and production (E&P) and the technology of subsea equipment and processes. It focuses on the description of a virtual decoupling method for improving the performance of the control system for managing the multiphase distribution of the streams from subsea oil wells.

BACKGROUNDS OF THE INVENTION

Stationary Production Units (SPUs) are offshore facilities responsible for extracting and separating oil into oil, water and gas. The oil can be stored, exported through oil pipelines or transferred to other vessels. The water is treated and can be reinjected, used in other applications or discarded. The gas is compressed in the SPU process plant and can be exported, used in oil recovery or burned for energy production. Both the water and gas that return to the reservoir pass through equipment in the SPU process plants.

The development of offshore oil fields occurs sequentially, with SPUs entering production in chronological order to meet availability and reservoir management criteria. However, this can result in some SPUs operating at capacity while others are partially idle, due to the lack of direct interconnection between the same.

When a SPU reaches its maximum capacity in one of its main subunits (oil, water or gas treatment plant), it is not possible to add new wells, leading to a bottleneck on the platform. One solution would be to redirect part of the excess fluids to a second nearby SPU, but this would generate inefficiencies, such as energy loss, high installation costs and underutilization of space in the processing plant.

These inefficiencies can be eliminated or reduced by optimizing the distribution of phases (oil, gas and water) in the wells on the seabed. Some subsea separation systems, such as SGLS (Subsea Gas-Liquid Separation) or SWOS (Subsea Water-Oil Separation), separate fluids based on specific gravity, creating light and heavy phases. Several studies on fluid separation and stream control have been conducted to improve the operation of oil fields.

STATE OF THE ART

Document WO 2021/209172 presents a comprehensive modular subsea system designed for the separation of produced oil and water from gas (with CO2) in a first stage, followed by the separation of oil from produced water in a second stage. This system aims at directing exclusively the oil to a specialized receiving facility, while the compressed gas and produced water are typically reinjected into the reservoir, often with the aid of a pressure booster.

Document BR 102015019642-3 presents a compact integrated station of subsea systems designed for fluid separation and pumping. This station is versatile and suitable for application in subsea systems aiming at separating fluids and/or solids, as well as pumping fluids. The document discloses a modular arrangement that allows the localized intervention in equipment and the integration of components for compaction and reduction of the size and weight of the modules, resulting in an improved subsea system for separating three-phase fluids and pumping the same.

Document BR 112016016005-3 describes a multiphase separation system designed to separate production fluids obtained from subsea wells. This system is designed to handle multiphase fluids, which include relatively immiscible aqueous and oil phase components. Production fluids cover a variety of hydrocarbons, comprising a mixture of natural gas, crude oil, brine and solid impurities, such as sand. The main focus of the document is the separation of fluids, especially in polyphase contexts. However, it does not address to the control management of streams destined for Stationary Production Units (SPUs) nor does it consider the possibility of multiple SPUs operating together or alternately.

Document BR 102021020223-8 describes a system that enables the controlled mixing of streams exported by two-phase or three-phase separators, allowing phase management according to the processing needs of the Stationary Production Units (SPUs). This system directs the outlet streams of the subsea separation modules to different SPUs, thus optimizing the processing capacity of the surface plants. In addition, the system is capable of adjusting process parameters in real time, such as the Gas-Liquid Ratio (GLR), the Gas-Oil Ratio (GOR) and the Water cut (amount of water in the oil), using the process' own autogenous pressure to make these adjustments, eliminating the need for artificial lifting systems. However, the document does not exclude the possibility of using pressure lifting systems, such as pumps or compressors, if the SPUs are located at considerable distances that require this type of assistance.

In turn, the present invention refers to a method designed to mitigate or eliminate the undesirable influence of different variables of the subsea processes described in the state of the art. In simple terms, the method separates or "decouples" the variables so that changes in the input variables do not adversely affect the output variables under control.

The decoupler acts to reduce or eliminate unwanted interactions between the variables in the subsea control system, which typically has high interdependence between these variables, making the operation more challenging.

The main objective of this invention is to improve the robustness and precision of the subsea processing system, allowing more effective control of the operational variables, even in the face of different production scenarios and disturbances.

Therefore, it is evident that the documents of the state of the art do not address to this specific functionality nor the potential technical advantages offered by the present invention. This highlights the gap in the state of the art regarding the need for a method capable of reducing the impact of the interactions between the control variables, aiming at improving the performance in the management of the multiphase distribution of the subsea streams in oil wells.

SUMMARY OF THE INVENTION

The present invention proposes a decoupling method for subsea processing systems, aiming at mitigating the operational complexity caused by the interaction between variables. Operating in the control layer, a virtual decoupling method makes use of models based on mass conservation laws to precisely estimate the liquid and gas flow rates, generating set points for the controllers.

This method allows the efficient management of properties such as the gas-to-liquid ratio (GLR) of the subsea streams, controlling the processing system and ensuring operational robustness.

More specifically, the present invention describes a virtual decoupling method for managing multiphase streams in subsea oil production modules that comprises: obtaining, by means of flow rate transducers, the measurement of the flow rate in the valves V1, V2, V3 and V4; obtaining, by means of gas-liquid ratio transducers (GLRT), the measurement of the gas-liquid ratio of the multiphase streams at the outlets of the subsea oil production module (GLR1, GLR2); obtaining, by means of the pressure transducer PT01 and the level transducer LT01, the measurement of pressure and level in the separator vessel; obtaining, by means of the flow rate transducers FT02 and FT03, the measurement of the flow rate of the gas streams; obtaining, by means of the flow rate transducers FT01 and FT04, the measurement of the flow rate of the liquid streams; calculating the total liquid flow rate (TLF) and the total gas flow rate (TGF); adjusting the GLR values for subsea processing conditions (GLRS); and defining the setpoint of the flow rate controllers of the streams leaving the separator vessel (FIC1SP, FIC2SP, FIC3SP and FIC4SP).

BRIEF DESCRIPTION OF THE DRAWINGS

The present invention will be described below with reference to its typical embodiments and with reference to the appended drawings, in which.

DETAILED DESCRIPTION OF THE INVENTION

The significant level of coupling or interaction between the operational variables of a processing plant becomes more pronounced when the capacitance of the equipment is low. In subsea processing systems, the capacitance is generally low due to the limited volume and weight of the equipment, which is a consequence of the need for technical and economic feasibility. As a result, this of type system naturally presents interdependent features that increase the complexity of the operations and can result in reduced production efficiency.

In order to mitigate or eliminate these effects, the present invention proposes a model-based decoupling method, operating in the control layer of the subsea system. Due to its model-driven approach to decision-making, this method can be treated as a "virtual decoupler", being designed for subsea processing plants dedicated to the management of the liquid and gas phases of the production.

The models incorporated in the decoupler are developed based on the principles of mass conservation laws. Using physical measurements obtained in the plant, these models precisely estimate the liquid and gas flow rates in the streams leaving the subsea system. Consequently, the decoupler generates precise setpoints for the controllers, guiding the operation in accordance with the production management objectives.

The virtual decoupler of this invention allows the management of properties of the streams useful for processing, such as Gas-Liquid Ratio (GLR), Gas-Oil Ratio (GOR) and Water Cut (WC).

As previously mentioned, the present invention aims at controlling the GLR of a subsea separation system, minimizing the effects of interactions between the control loops, which results in greater robustness in the operation.

Figure 1:
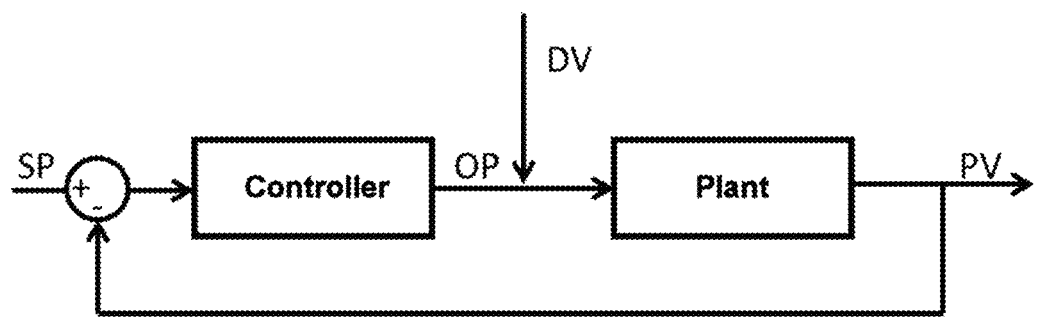
FIG. 1 is a representation of a typical feedback control loop according to the present invention.

To this end, control loops are considered, whose generic representation is shown in FIG. 1, where OP represents the manipulated variable (input), PV the controlled variable (output), SP is the setpoint (reference), and DV the disturbance or disturbance suffered by the system.

Figure 2:
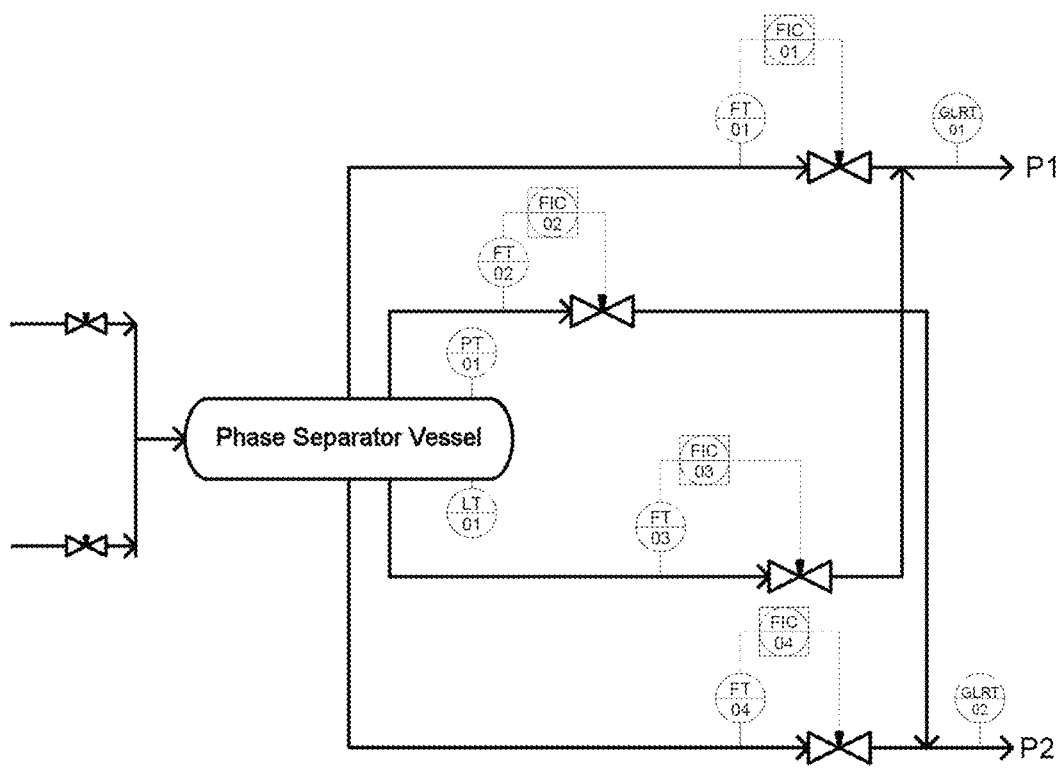
FIG. 2 is a representation of the structure of the subsea separation plant containing the flow rate loops according to the present invention.

FIG. 2 presents the structure of the subsea separation plant containing the flow rate loops, as well as the following elements associated with its architecture:

Flow rate transducer (FT)—responsible for measuring the single-phase liquid (F01 and F04) and gaseous (F02 and F03) flow rates;

Valves V1, V2, V3 and V4—present in the lines that derive from the phase separator vessel, with V1 and V4 responsible for intervening in the flow rates of the liquid streams while V2 and V3 do the same in the gas streams;

Flow rate controller and indicator (FIC)—responsible for controlling the flow rate;

GLR transducer (GLRT)—present at the outputs of the two control lines;

Pressure transducer (PT)—present in the separator vessel;

Level transducer (LT)—present in the separator vessel.

As illustrated in FIG. 2, the separator vessel considered in the present invention has only two output streams for each phase, but the method is valid for any number of streams.

The liquid streams leaving the separator vessel have individual flow rates F01 and F04, while the gaseous flow rates are F02 and F03, controlled respectively by the flow rate controllers and indicators FIC01, FIC04, FIC02 and FIC03, in valves V1, V4, V2 and V3. The total liquid flow rate (TLF) and the total gas flow rate (TGF) are given according to equations (1) and (2):

$$TLF = F01 + F04 \quad (1)$$
$$TGF = F02 + F03 \quad (2)$$

The invention presents a hierarchical control structure composed of two distinct layers: a servo layer, with the flow rate controllers and indicators (FIC), and a master layer that operates above the servo layer, generating the global drivers of the plant in terms of Gas-Liquid Ratio (GLR), using the setpoints of the mentioned controllers. These setpoints provide the manipulated values for four variables that are 2 liquid flow rates and 2 gas flow rates (LF1SP, LF2SP, GF1SP and GF2SP). The master layer is a control strategy based on mass conservation models and measurements of process plant instruments.

Furthermore, the present invention uses as controlled variables:
the level of the separator vessel, measured by LT-01;
the pressure of the separator vessel, measured by PT-01; and
the value of the gas-liquid ratio GLR, measured by GLRT-01 and GLRT-02, for the export streams of the subsea module.

Since the GIR is measured in the standard condition (standard) by the GLRT, such values must be converted to subsea processing conditions (GLRS1 and GLRS2), from an appropriate thermodynamic model, that is:

$$GLRS_i = f(GLR_i, T, P) \quad (3)$$

where GLRSi is the gas-liquid ratio of the stream i under subsea process conditions, and GLRi is the gas-liquid ratio of the stream i under standard conditions, T is the temperature and P is the pressure under subsea conditions.

From the GLR values already adjusted for subsea conditions (GLRS01 and GLRS02) and the total liquid and gas flow rates (TLF and TGF), the value of each setpoint of the flow rate controllers of the streams leaving the separator vessel (FIC1SP, FIC2SP, FIC3SP and FIC4SP) is calculated by using expressions (4) to (7):

$$FIC1SP = \frac{TGF - TLF * GLRS2SP}{GLRS1SP - GLRS2SP} \quad (4)$$

$$FIC4SP = \frac{-GLRS1SP * TLF + TGF}{GLRS1SP - GLRS2SP} \quad (5)$$

$$FIC2SP = \frac{GLRS1SP * (TGF - TLF * GLRS2SP)}{GLRS1SP - GLRS2SP} \quad (6)$$

$$FIC3SP = \frac{-GLRS2SP * (-GLRS1SP * TLF + TGF)}{GLRS1SP - GLRS2SP}, \quad (7)$$

Here, controllers with typical structure available in the DCS can be used, such as the proportional-integral (PI).

The total liquid flow rate (TLF) and total gas flow rate (TGF) are the manipulated variables of the level and pressure controllers of the phase separation vessel, respectively, calculated from any control algorithm, such as, for example, a proportional-integral (PI) controller, aiming at guaranteeing operational stability.

Figure 3:
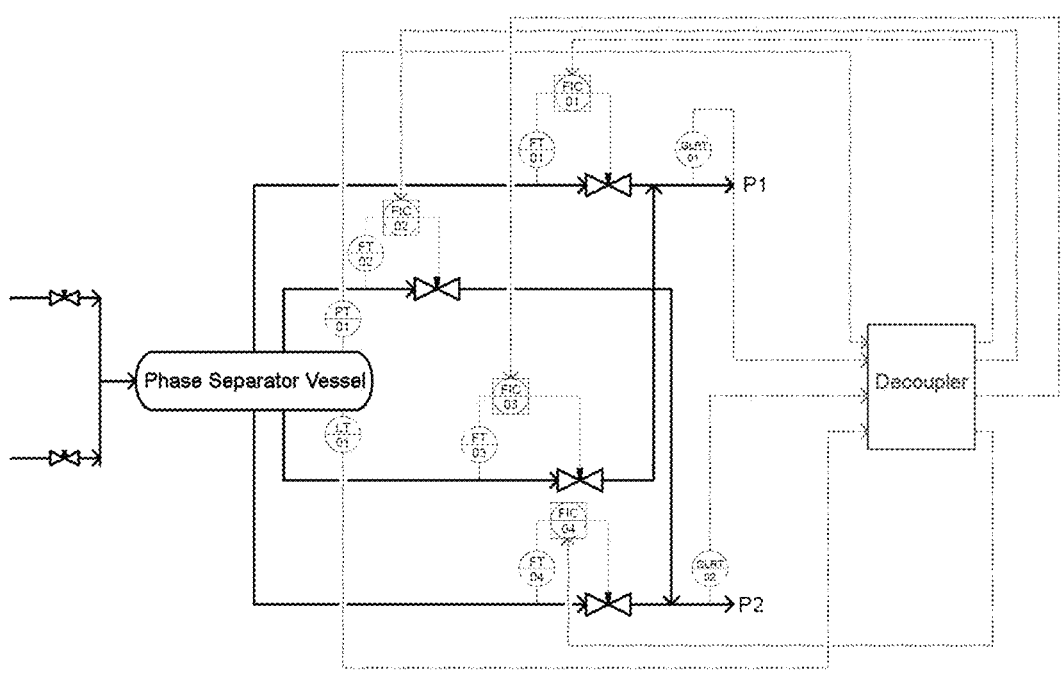
FIG. 3 is a representation of the structure of the subsea separation plant containing all the loops (master and slave) according to the present invention.

A GLR controller is responsible for providing the setpoints for GLRS1SP and GLRS2SP, aiming at eliminating discrepancies arising from equation 3. FIG. 3 illustrates the complete control structure.

The invention can operate without the presence of GLR controllers, maintaining fixed values, but the performance will be impaired. In this case, the setpoints of these properties (GLRS1 and GLRS2) would be fixed.

The present invention can also be applied without the availability of subsea single-phase flow rate meters, only with the measurements of GLR (GLR1 and GLR2) and the total flow rates arriving at the platform (TGF and TLF). The subsea flow rates of the individual streams leaving the vessel (F01, F04, F02 and F03) can be estimated using the same set of equations (4 to 7), but rewritten as follows:

$$F01 = \frac{TGF - TLF * GLR2}{GLR1 - GLR2} \quad (8)$$

-continued $$F04 = \frac{-GLR1 * TLF + TGF}{GLR1 - GLR2} \quad (9)$$

$$F02 = \frac{GLR1 * (TGF - TLF * GLR2)}{GLR1 - GLR2} \quad (10)$$

$$F03 = \frac{-GLR2 * (-GLR1 * TLF + TGF)}{GLR1 - GLR2} \quad (11)$$

Demonstration

The demonstrations in this section are intended to exemplify one of the numerous applications of the invention, however without limiting its scope.

Figure 4:
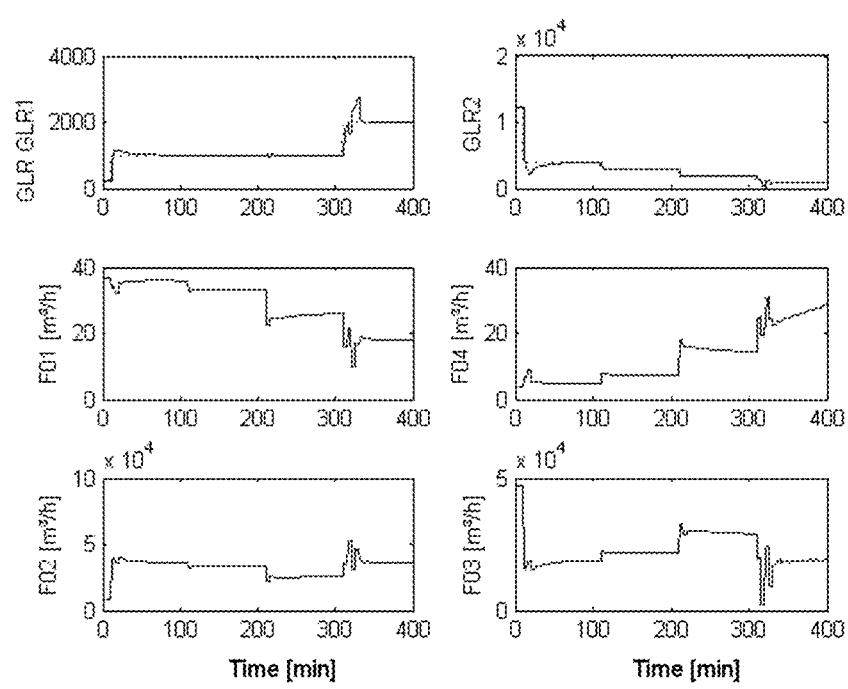
FIG. 4 presents results of the application of the method of the present invention showing the simulation of the GLR variables against the other controlled flow rate variables.

In this example, rigorous simulation data is presented, based on a representative process simulation. FIG. 4 shows the behavior of the slave loops for manual variations in the GLR setpoint. Such alterations will certainly be applied, although not to such a large extent, to adapt the specifications of the lines to the capacities of the SPUs. It can be seen that the system remained robust even for very significant variations in GLR. It is also worth emphasizing that changing the setpoint of one loop caused almost imperceptible variations in the other, which attests to the quality of the proposed decoupling method.

Figure 5:
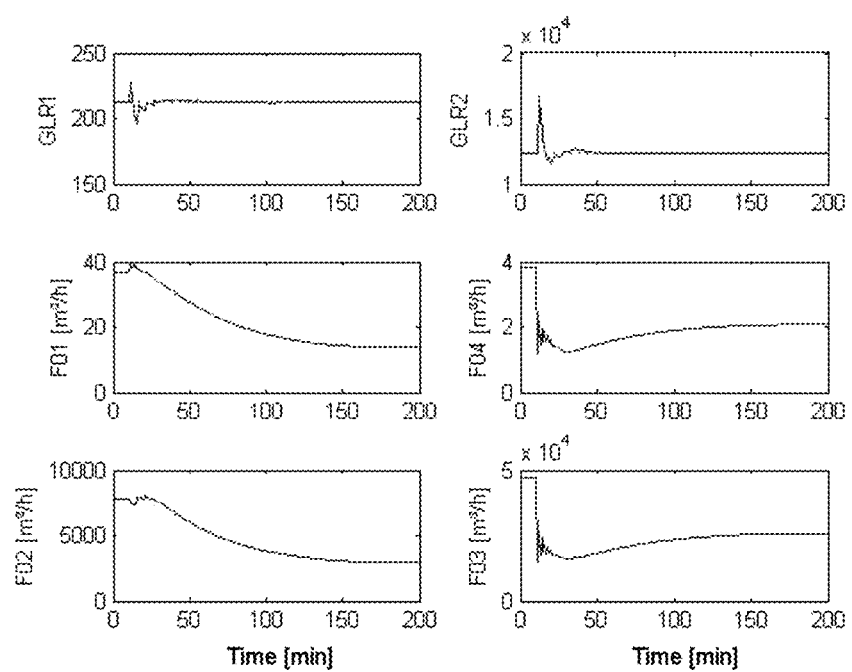
FIG. 5 presents results of the application of the method of the present invention showing the response of the GLR variables against the other controlled flow rate variables.

FIG. 5 shows the robustness analysis of the system, where the feed flow rate is cut in half. This shows the behavior of the tank inventory loops. Such a disturbance is analogous to the cutting of one of the feed wells of the system, which has a significant operational impact, although not uncommon. It can be seen that both the level and the pressure remained at adequate values, corroborating the validity of this invention.

While aspects of the present invention may be susceptible to various modifications and alternative forms, specific embodiments have been shown by way of example in the drawings and have been described in detail herein. But it should be understood that the invention is not intended to be limited to the particular disclosed forms. Rather, the invention is intended cover to all modifications, equivalents and alternatives that fall within the scope of the invention as defined by the following attached claims.

The invention claimed is:
1. A virtual decoupling method for managing multiphase streams in subsea oil production modules, comprising:
obtaining, by means of flow rate transducers, a measurement of a flow rate in valves V1, V2, V3 and V4;
obtaining, by means of gas-liquid ratio transducers (GLRT), a measurement of a gas-liquid ratio of the multiphase streams at outputs of the subsea oil production modules (GLR1, GLR2);
obtaining, by means of a pressure transducer PT01 and a level transducer LT01, a measurement of pressure and level in a separator vessel;
obtaining, by means of flow rate transducers FT02 and FT03, a measurement of a flow rate of a gas streams;
obtaining, by means of flow rate transducers FT01 and FT04, a measurement of a flow rate of a liquid streams;
calculating a total liquid flow rate (TLF) and a total gas flow rate (TGF);
adjusting GLR values for subsea processing conditions (GLRS); and
defining a setpoint of flow rate controllers of streams leaving the separator vessel (FIC1SP, FIC2SP, FIC3SP and FIC4SP.
2. The method according to claim 1, wherein the liquid streams leaving the separator vessel have individual flow rates F01 and F04, while the gas flow rates are F02 and F03, controlled respectively by the flow rate controllers and indicators FIC-01, FIC-04, FIC-02 and FIC-03, in the valves V1, V4, V2 and V3.

3. The method according to claim 1, wherein the total liquid flow rate (TLF) and the total gas flow rate (TGF) are given according to the equations:

$$TLF = F01 + F04, \quad (1)$$

$$TGF = F02 + F03. \quad (2)$$

4. The method according to claim 1, wherein the adjustment of the GLR values for subsea processing condition (GLRS) follows the equation:

$$GLRS_i = f(GLR_i, T, P), \quad (3)$$

where GLR Si is the gas-liquid ratio of the stream i under subsea process conditions, and GLRi is the gas-liquid ratio of the stream i under standard conditions, T the temperature and P the pressure under subsea conditions.

5. The method according to claim 1, wherein the definition of the setpoint of the flow rate controllers of the streams leaving the separator vessel (FIC1SP, FIC2SP, FIC3SP and FIC4SP) follows the equations:

$$FIC1SP = \frac{TGF - TLF * GLRS2SP}{GLRS1SP - GLRS2SP}; \quad (4)$$

$$FIC4SP = \frac{-GLRS1SP * TLF + TGF}{GLRS1SP - GLRS2SP}; \quad (5)$$

$$FIC2SP = \frac{GLRS1SP * (TGF - TLF * GLRS2SP)}{GLRS1SP - GLRS2SP}; \quad (6)$$

$$FIC3SP = \frac{-GLRS2SP * (-GLRS1SP * TLF + TGF)}{GLRS1SP - GLRS2SP}. \quad (7)$$

\* \* \* \* \*